Patented Oct. 19, 1926.

1,603,317

UNITED STATES PATENT OFFICE.

CLARENCE M. CARSON, OF AKRON, OHIO, ASSIGNOR TO THE GOODYEAR TIRE & RUBBER COMPANY, OF AKRON, OHIO, A CORPORATION OF OHIO.

METHOD OF VULCANIZING CAOUTCHOUC AND PRODUCT PRODUCED THEREBY.

No Drawing.   Application filed February 15, 1924.   Serial No. 693,140.

My invention relates to the vulcanization of caoutchouc, and it is particularly concerned with the acceleration of such process to obtain rubber stock of high quality that is adapted for general application.

It is now well known that accelerators are highly desirable for the production of rubber, because, not only has the process of vulcanization been expedited thereby, but desirable physical properties may be obtained in the rubber by employing such materials. Many compounds, both organic and inorganic, have been suggested as accelerators, all of which probably have desirable characteristics, but usually such characteristics so differ that the various compounds have particular applications, depending upon the properties desired in the finished articles.

My invention is particularly concerned with certain organic accelerators, which have not been suggested heretofore, to the best of my knowledge, and which possess desirable features in that they are moderately powerful and relatively inexpensive. It is desirable to have, in some instances, accelerators that shall not be excessively powerful, but which shall be sufficiently active to produce a stock in a moderate time without danger of scorching or over-curing the rubber compound. The class of accelerators contemplated by my invention are amidothiophenols, their disulfides, and metallic salts.

An example of one of the accelerators included in my invention is zinc ortho-amidothiophenolate, having the structural formula

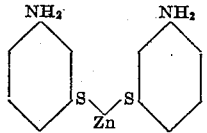

The ortho-diamido-diphenyl disulfide

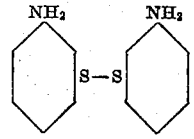

may be easily prepared, and is also a very satisfactory accelerator. An example of a compound that may be employed, not only with this accelerator, but with those hereinafter mentioned, is as follows: 100 parts rubber, 5 parts zinc oxide, 6 parts sulfur, 1 part accelerator.

It is desirable to employ, with all of the accelerators mentioned herein, either zinc or lead oxide, since better results may be obtained with a compound containing such materials. Lead ortho-amidothiophenolate, or cadmium ortho-amidophenolate, are additional examples of compounds similar to the accelerator above mentioned.

Other examples of accelerators coming within the broad classification are zinc para-amidothiophenolate, lead para-amidothiophenolate, or basic lead para-amidothiophenolate, which is preferred, inasmuch as it is an amorphous powder that is more agreeable to handle.

Zinc ortho-amidothiocresolate, lead ortho-amidothiocresolate, or the disulfide of artho-amidothiocresol also form examples of accelerators coming within the scope of my invention. Corresponding to these latter compounds are zinc para-amidothiocresolate and lead para-amidothiocresolate, or the disulfide of para-amidothiocresol may also be employed.

Still other examples of accelerators comprehended by my invention are zinc dimethylamidothiophenolate, lead dimethylamidothiophenolate, and the disulfide or tetramethyl-diamido-diphenyl-disulfide.

Although examples have been given of bivalent metallic salts of the various amidothiophenols, it should be noted, also, that monovalent and trivalent salts may be employed. For example, monovalent metallic salts, such as ammonium, sodium and potassium, of any of the foregoing amidothiophenols may be employed. Ferric and aluminum salts of the compounds may be formed, which serve as examples of trivalent metals that may be employed to form accelerators of such compounds. Moreover, it will be noted that in each instance a metallic salt or disulfide has been specified, but it is also true that the amidothiophenols may be utilized. However, the amidothiophenols are oils which are rather unstable, going to the disulfides readily, which are more stable, and consequently, more practical for general application. The salts of the various amidothiophenols are also stable compounds, and consequently, the salts, as well as the disulfides, are preferred by reason of such stability. However, if it is desirable for some reason, the various amidothiophenols may be used as such, and will provide satisfactory acceleration in the vulcanizing process.

As hereinbefore mentioned, the example of compound given is representative of a method of employing all of the accelerators, inasmuch as any one might be incorporated in such compound and a good cure obtained. Of course, the length of time necessary to obtain the proper vulcanization will vary somewhat with the different compounds, but good cures may be obtained in periods ranging from forty minutes to an hour and a half, at a temperature corresponding to 40 pounds of steam pressure. As above mentioned, better physical characteristics may be obtained by employing zinc or lead oxide in the compound. In any event, all of the accelerators are capable of general application, and the particular characteristics desired in the cured rubber, controls, to a certain extent, their exact method of compounding. However, with the information advanced herein, anyone skilled in the art might readily apply these compounds to obtain satisfactory results.

Although I have described and specifically named a number of compounds as embodiments of my invention, it will be appreciated that other compounds coming within the same general class may be employed within the spirit and scope of the invention, and while I have set forth specific amounts of materials that may be suitably compounded together, it is obvious that such amounts may be varied according to particular circumstances, and I desire, therefore, that no limitations shall be imposed, except such as are indicated in the appended claims.

What I claim is:—

1. A method of vulcanizing caoutchouc that comprises admixing caoutchouc with a vulcanizing agent, adding an amidothiophenol to the mixture and applying heat thereto.

2. A method of vulcanizing caoutchouc that comprises admixing caoutchouc with a vulcanizing agent, adding a diamido-diphenyl-disulfide to the mixture and applying heat thereto.

3. A method of vulcanizing caoutchouc that comprises admixing caoutchouc with a vulcanizing agent, adding a metallic salt of an amidothiophenol to the mixture and applying heat thereto.

4. A method of vulcanizing caoutchouc that comprises admixing caoutchouc with a vulcanizing agent, adding a bivalent metallic salt of an amidothiophenol to the mixture and applying heat thereto.

5. A method of vulcanizing caoutchouc that comprises admixing caoutchouc with a vulcanizing agent, adding a zinc salt of an amidothiophenol to the mixture and applying heat thereto.

6. A method of vulcanizing caoutchouc that comprises admixing caoutchouc with a vulcanizing agent, adding zinc ortho-amidothiophenolate to the mixture and applying heat.

7. A method of vulcanizing caoutchouc that comprises admixing caoutchouc with a vulcanizing agent, adding zinc ortho-diamido-diphenyl-disulfide to the mixture and applying heat.

8. A method of vulcanizing caoutchouc that comprises admixing caoutchouc with a vulcanizing agent, adding zinc para-amidothiophenolate to the mixture and applying heat thereto.

9. A method of vulcanizing caoutchouc that comprises admixing caoutchouc with a vulcanizing agent, adding para-diamido-diphenyl disulfide to the mixture and applying heat thereto.

10. A method of vulcanizing caoutchouc that comprises admixing caoutchouc with a vulcanizing agent, adding zinc ortho-amidothiocresolate to the mixture and applying heat thereto.

11. A method of vulcanizing caoutchouc that comprises admixing caoutchouc with a vulcanizing agent, adding ortho-diamido-dicresyl disulfide to the mixture and applying heat thereto.

12. A method of vulcanizing caoutchouc that comprises admixing caoutchouc with a vulcanizing agent, adding zinc para-amidothiocresolate to the mixture and applying heat thereto.

13. A method of vulcanizing caoutchouc that comprises admixing caoutchouc with a vulcanizing agent, adding para-diamido-dicresyl disulfide to the mixture and applying heat thereto.

14. A method of vulcanizing caoutchouc that comprises admixing caoutchouc with a vulcanizing agent, adding zinc dimethyl-amidothiophenolate to the mixture and applying heat thereto.

15. A method of vulcanizing caoutchouc that comprises admixing caoutchouc with a vulcanizing agent, adding tetra-dimethyl-diamido-diphenyl disulfide to the mixture and applying heat thereto.

16. A vulcanized caoutchouc product formed by the reaction of caoutchouc, a vulcanizing agent and an amidothiophenol.

17. A vulcanized caoutchouc product formed by the reaction of caoutchouc, a vulcanizing agent and diamido-diphenyl disulfide.

18. A vulcanized caoutchouc product formed by the reaction of caoutchouc, a vulcanizing agent and a metallic salt of an amidothiophenol.

19. A vulcanized caoutchouc product formed by the reaction of caoutchouc, a vulcanizing agent and a bivalent metallic salt of an amidothiophenol.

20. A vulcanized caoutchouc product formed by the reaction of caoutchouc, a vulcanizing agent and zinc ortho-amidothiophenolate.

21. A vulcanized caoutchouc product formed by the reaction of caoutchouc, a vulcanizing agent and zinc para-amidothiophenolate.

22. A vulcanized caoutchouc product formed by the reaction of caoutchouc, a vulcanizing agent and zinc ortho-amidothiophenolate.

23. A vulcanized caoutchouc product formed by the reaction of caoutchouc, a vulcanizing agent and zinc para-amidothiocresolate.

24. A vulcanized caoutchouc product formed by the reaction of caoutchouc, a vulcanizing agent and zinc dimethyl-amidothiophenolate.

In witness whereof, I have hereunto signed my name.

CLARENCE M. CARSON.